United States Patent [19]

Horton

[11] Patent Number: 4,574,885

[45] Date of Patent: Mar. 11, 1986

[54] AGENTS FOR PETROLEUM RECOVERY PROCESSES

[75] Inventor: Robert L. Horton, Chagrin Falls, Ohio

[73] Assignee: Phillips Petroleum Company, Bartlesville, Okla.

[21] Appl. No.: 625,337

[22] Filed: Jun. 27, 1984

[51] Int. Cl.$^4$ .............................................. E21B 43/22
[52] U.S. Cl. ..................... 166/270; 166/273; 166/274; 252/8.55 D
[58] Field of Search ............... 166/273, 274, 275, 270, 166/300, 305 R; 252/8.55 D, 8.55 R

[56] References Cited

U.S. PATENT DOCUMENTS

| | | | |
|---|---|---|---|
| 2,761,843 | 9/1956 | Brown | 252/8.55 D |
| 3,382,924 | 5/1968 | Veley et al. | 166/305 R |
| 3,419,072 | 12/1968 | Maly et al. | 166/295 |
| 3,422,890 | 1/1969 | Darley | 166/274 |
| 3,444,931 | 5/1969 | Braden, Jr. | 166/305 R X |
| 3,483,923 | 12/1969 | Darley | 166/271 |
| 3,500,925 | 3/1970 | Beiswanger et al. | 166/305 R X |
| 3,578,781 | 5/1971 | Abrams et al. | 166/305 R |
| 3,783,944 | 1/1974 | Jennings et al. | 166/273 X |
| 3,804,173 | 4/1974 | Jennings | 166/275 |
| 3,827,495 | 8/1974 | Reed | 166/250 |
| 3,880,765 | 4/1975 | Watson | 166/275 X |
| 3,945,437 | 3/1976 | Chiu et al. | 166/305 R |
| 3,981,363 | 9/1976 | Gall | 166/270 |
| 4,137,969 | 2/1979 | Phalangas et al. | 166/274 |
| 4,207,946 | 6/1980 | Haltmar et al. | 166/274 |
| 4,217,988 | 8/1980 | Doster et al. | 166/274 |
| 4,282,930 | 8/1981 | Grodde et al. | 166/305 R |
| 4,284,517 | 8/1981 | Chen et al. | 252/8.55 D |
| 4,341,647 | 7/1982 | Hunter | 166/275 X |
| 4,374,739 | 2/1983 | McLaughlin et al. | 166/305 R X |
| 4,447,342 | 5/1984 | Borchardt et al. | 166/275 X |
| 4,452,308 | 6/1984 | Haskin et al. | 166/275 X |
| 4,489,984 | 12/1984 | Savins | 166/273 X |

OTHER PUBLICATIONS

J. Chem. Tech. Biotechnol., vol. 31, pp. 584–592, 1981.

Primary Examiner—George A. Suchfield
Attorney, Agent, or Firm—L. M. Lavin

[57] ABSTRACT

Polyfunctional anionic polymers are useful for inhibiting the adsorption of surfactants and organic polymers in formations such as clay-containing oil reservoirs or clay-containing oil reservoirs which have previously been treated with polyfunctional cationic polymers.

16 Claims, No Drawings

AGENTS FOR PETROLEUM RECOVERY PROCESSES

This invention relates to the recovery of oil from subterranean reservoirs by flooding methods. In particular it relates to polymers useful in this flooding method.

Crude oil which is accumulated in subterranean reservoirs is recovered or produced through one or more wells drilled into the reservoir. Initial production of the crude oil is accomplished by "primary recovery" techniques wherein only the natural forces present in the reservoir are utilized to produce the oil. However, upon depletion of these natural forces and the termination of primary recovery, a large portion of crude oil remains trapped within the reservoir. Also, many reservoirs lack sufficient natural forces to be produced by primary methods from the very beginning. Recognition of these facts has led to the development and use of many enhanced oil recovery techniques. Most of these techniques involve injection of at least one fluid into the reservoir to produce an additional amount of crude oil therefrom. Some of the more common methods are waterflooding, steam flooding, miscible flooding, $CO_2$ flooding, polymerflooding, surfactantflooding, caustic flooding and in situ combustion.

Waterflooding, which involves the injection of water into the subterranean oil reservoir for the purpose of displacing the crude oil from the poree spaces of the reservoir rock towards the producing wells, in the most economical and widely used of the enhanced oil recovery methods. Nevertheless water does not displace oil with high efficiency because of the immiscibility of water and oil and because of the high interfacial tension between them.

Often times in waterflooding, sands and other materials will become entrained in the recovered oil. This is prevented by the addition of a clay stabilization or sand stabilization material. Epoxy resins are often used for this process. Also used in this process are polyfunctional cationic polymers, such as poly(N-acrylamidomethyltrimethyl ammonium chloride) or poly(vinylbenzyltrimethyl ammonium chloride).

Surfactant flooding involves the addition of one or more surface active agents or surfactants to the waterflood for the purpose of lowering the high interfacial tension between the oil and the water, allowing the water to displace the oil more effectively. It is well-known in the art to use petroleum sulfonates as surfactants in this oil recovery operation.

One problem arising during surfactant flooding is that the surfactant chemicals will adsorb onto the mineral grains of the reservoir rock. This results in an ever declining concentration of the surfactant chemicals as they progress through the reservoir. The use of clay stabilizers, such as polyfunctional cationic polymers, adds to the amount of surfactant adsorbed. To compensate for this phenomenon large amounts of surfactant materials are injected into the reservoir, which renders the use of such surfactants uneconomical.

Another related problem inherent in any flooding technique concerns the sweep efficiency of the flooding operation. The sweep efficiency for a flooding operation is directly related to the ratio of the relative mobilities of the displacing and displaced fluids. In almost all cases the unmodified surfactant fluid has a higher relative mobility than the residual oil in the reservoir. This results in poor sweep efficiency, which causes premature breakthrough of the injected surfactant fluid into the production wells. This premature breakthrough by a selective fingering of the injected fluid through the reservoir leaves a substantial portion of the reservoir volume unswept by the injected surfactant fluid. One solution to this problem of poor sweep efficiency is to increase the viscosity of the displacing fluid.

The common method of achieving this has been to add organic polymers to the injected water which has the effect of increasing water viscosity thereby increasing the sweep efficiency of the recovery technique. It is well-known in the prior art to use aqueous solutions of high molecular weight partially hydrolyzed polyacrylamides to increase the viscosity of injected water. Unfortunately these polymers are expensive and are adsorbed on the mineral grains of the reservoir rock in much the same way as the surfactants are adsorbed.

The object of this invention is to reduce the adsorption of surfactants in formations. Another object of this invention is to provide an inexpensive compound that will reduce the adsorption of surfactants in formations. Another object is to reduce the adsorption of organic polymers, added to increase water viscosity, in formations.

SUMMARY OF THE INVENTION

According to the instant invention polyfunctional anionic polymers such as poly(sodium acrylate) are injected into stabilized or unstabilized formations, such as those found in subterranean oil reservoirs, before or at the same time as the addition of a surfactant or organic polymers in order to inhibit the adsorption of surfactant or organic polymer in the formation.

DETAILED DESCRIPTION OF THE INVENTION

Generally, the materials of subterranean formations, such as clay, have both cation and anion exchange sites containing charges that will adsorb surfactants such as petroleum sulfonate anions. Stabilization polymers, such as poly(vinylbenzyltrimethylammonium chloride), contain cationic functional groups. This increases the amount of interaction of the surfactants with the stabilized clay material. Therefore, the injection of a polyfunctional anionic polymer, especially after the initial clay stabilization step, converts the cationic material to a salt form. The salt form product will no longer have any significant affinity for an anionic surfactant. Lower molecular weight polymers are more desirable for the anionic polyacrylate because of their increased ability to penetrate and diffuse into the formation. These chemicals are relatively inexpensive and readily available.

Any polyfunctional anionic polymer can be suitable within the scope of this invention. Preferably low molecular weight polymers are chosen because of their increased ability to penetrate into the formation. These polymers can be linear or cross-linked. Linear and only slightly cross-linked polymers are preferred. Wholly linear polymers are especially preferred.

The classes of polymers useful in this invention include acidic polymers and the salts thereof produce from the partial or total neutralization by alkali metal or alkaline earth metal hydroxides. Acidic polymers which have been totally neutralized to sodium salts are most preferred. Acidic polymers can be chosen from ethanedicarboxylic acid(oxalic acid), propanetricarboxylicacid, poly(acrylic acid), poly(acrylic acid-co-acrylamide), poly(acrylic acid-co-styrene), poly(styrene sulfonic acid), poly(acrylic acid-co-styrene sulfonic acid), poly(vinylsulfonic acid), poly(methacrylic acid), poly(vinyl phosphoric acid), poly(chloroacrylic acid), poly(bromoacrylic acid), poly(vinylbenzoic acid), poly(vinylbutylsulfonic acid), or the salts of any of the above. Poly(sodium acrylate) and poly(sodium styrenesulfonate) are especially preferred.

The molecular weight range of these polymers varies over the range of about 150 to 5,000,000. In regard to the degree of polymerization, suitable polymers preferably have a degree of polymerization of 2 to 100, more preferably a degree of polymerization from about 3 to 20.

The surfactants, with which the polymers of the instant invention should be used, include any surfactant that would be subject to adsorption onto formation anion exchange sites. These can include, but are not limited to petroleum sulfonates, alkylsulfates, alkylarylsulfates, ethoxylated alkyl or alkylarylsulfates, alkylarylsulfonates, alkylsulfonates, alkylpolyethoxyalkylene sulfonates, and alkylarylpolyethoxyalkylenesulfonates.

Organic polymers that are used as viscosity increasing agents, with which the polymers of the instant invention should be used, include a wide scope of the polymers that are used in oil recovery that can be susceptible to adsorption by anion exchange sites found in the formation. These include both hydrolyzed and unhydrolyzed polyacrylamides, polysaccharides and other compounds, generally of high molecular weight and containing anionic groupings that are useful in increasing water viscosity.

The polymers of the instant invention can be applied in any appropriate concentration. Generally, the concentration should be sufficient to prevent adsorption of the surfactant or organic polymer material. The instant invention polymers are usually completely water soluble in all concentrations. Therefore, highly concentrated solutions of them can be injected into the formation over a fairly short period of time to accomplish the treatment according to the invention. The concentration will preferably range from about 0.001 to about 10 percent by weight in the water injected into the formation. Most preferably it will range from 0.01 to about 5 percent.

The dosage can be based on the number of reduced equivalents of polycationic polymer when these stabilizing polymers are applied in the secondary recovery phase. A reduced equivalent of, for instance, poly(vinylbenzyl trimethyl ammonium chloride) having an equivalent weight of around $10^3$ and one having an equivalent weight around $10^6$ are the same, 197.71 grams, being the equivalent weight of the monomer. Similarly, a reduced equivalent of poly(acrylic acid) is 72.06 grams. The dosage can alternatively be based on the anion exchange capacity, typically reported in milliequivalents per/100 grams of reservoir rock. The number of equivalents of anions a reservoir will adsorb is the product of the anion exchange capacity, the volume of the reservoir and the average density of the reservoir rock.

The useful dosage of the instant invention polymer is equal to 0.01 to 10 times either the number of reduced equivalents of the polycationic polymer applied in the secondary recovery phase or the number of equivalents of anions the reservoir will absorb. Preferably 0.5 to 10 times that number of equivalents and especially preferably 2 to 4 times that number. If a copolymer like poly(acrylic acid-co-styrene) is used then only the acrylic acid fraction is used in calculating the reduced equivalent weight. With a copolymer like poly(acrylic acid-co-styrene sulfonic acid) both monomer fractions are used.

In applying the compounds of the instant invention, it is first necessary to determine the compatibility of the compound with the water to be injected into the formation. Incompatibility will sometimes arise where certain salts in the water, such as calcium or magnesium salts, precipitates the polymer compounds of the instant invention. If this occurs, less cross-linked or wholly uncross-linked compounds within the scope of this invention can be used. A simple switching of polymers, for instance from poly(sodium acrylate) to poly(sodium vinyl sulfonate), can sometimes solve the incompatibility. Another alternative is to switch to a compatible injection water.

Treatment with the polymers in accordance with the invention can precede or take place simultaneously with the addition of the surfactant or organic polymer, but preferably precede the addition of the surfactant or organic polymer to the formation.

It is clear from the description of this invention that the polymers of the instant invention can be used in the treatment of any formation containing sites that will adsorb compounds one desires to use in enhanced oil recovery. These formations include sandstones, clays, feldspars, or any other normally charged formation rocks. The preferred formation to be treated are clay materials or clay-containing materials that are found in subterranean oil reservoirs.

The following examples should further help describe the invention.

EXAMPLE I

A 200 g. sample of barren uranium ore from the Grants, NM area, a feldspathic sandstone containing minor clayey substituents, which was judged to be similar to the rocks of many oil-bearing formations was slurried with 200 g. water, 4 g. Cla-Sta B concentrate (a water soluble cationic clay stabilization polymer marketed by Haliburton Co., Houston, TX, and known to be a linear polymer having multiple quaternary ammonium cation functionality) and 24 g. $(NH_4)_2SO_4$ at room temperature for 30 minutes and filtered. The cake analyzed <0.01 wt % total sulfur. 10 g. of the polymer treated ore was further treated with 20 g. water and 2.0 g. sodium dodecylbenzene-sulfonate (SDDBS), filtered and thoroughly washed. This cake contained 0.24 wt % S, demonstrating substantial chemisorption of sulfonate onto the treated ore.

A 20 g. sample of the Cla-Sta treated ore was similarly treated with 20 g. water and 4 g. poly-sodium acrylate solution (65 wt %, 2000 mol. wt.) and filtered. A 10 g. sample of this treated ore (Cla-Sta and polyacrylate) which contained <0.01 wt % S was further treated with 20 g, water and 2.0 g. SDDBS, filtered and washed. This cake analyzed 0.021 wt % S, indicating minor chemisorption of sulfonate, but only about one-tenth that absorbed by ore treated only with Cla-Sta polymer.

A further test of Cla-Sta treated ore was made in which 10 g was slurried with 10 g. 1M $Na_2S_4$, filtered and washed. The cake analyzed 0.38 wt % S, indicating strong affinity of this treated ore for sulfide. A 10 g. sample of untreated ore was slurried with 20 g. water and 2 g. SDDBS, filtered and washed. This cake retained very little sulfonate, analyzing only 0.054 wt %

S. Finally, a 10 g. sample of ore which had been treated as before with polyacrylic acid solution was treated with 20 g. water plus 2 g. SDDBS, filtered and washed. This ore with only the polyanionic polymer treatment analyzed <0.010 wt % S, thus it had even less affinity for sulfonate than the untreated ore.

In summary, these tests show that the untreated rock has significant affinity for sulfonate (0.054%), and treatment with a cationic polymer solution (Cla-Sta) increased affinity for sulfonate more than fourfold. Treatment of either raw rock or rock previously treated with cationic polymer, with anionic polymer (polyacrylates) yielded rock with very low affinity for sulfonate.

EXAMPLE II

A series of wetting tests was made using Dixie Clay (kaolin) to measure the effect the polymers used in Example 1 had on the lipophilic character of the clay.

Test A 25 g. clay were shaken in a separatory funnel with 400 mL distilled water and 400 mL kerosine and the phases allowed to separate. The clay was filtered from each phase, dried and weighed.

Test B

Same as A except 5 g. Cla-Sta concentrate was added to the water.

Test C

Similar to A except clay was first treated with 5 g. Cla-Sta in 200 mL water, filtered then repulped with 400 mL water and 400 mL kerosine.

Test D

Same as C except after agitation in the water-kerosene 5 g. polyacrylate in 40 g water was added and agitated followed by addition of 5 g. SDDBS in 45 g. water.

Test E

Same as D except sulfonate step omitted.

Test F

Same as D except poly-acrylate step omitted.

Test G

Same as D except both sulfonate and polyacrylate steps omitted.

Test H

Same as A except 5 g. SDDSB in 45 g. water added after initial agitation and reagitated.

Test I

Same as A except after initial agitation 5 g. polyacrylate was added and the phases reagitated before settling.

| Results of Tests | | |
|---|---|---|
| Test No. | Agents Added | % Lipophilic Clay (Hydrocarbon Wet) |
| A | None | 99 |
| B | Cla-Sta | 71 |
| C | Cla-Sta | 69 |
| D | Cla-Sta + polyacrylate + sulfonate | 21 |
| E | Cla-Sta + polyacrylate | 17 |

| -continued | | |
|---|---|---|
| Results of Tests | | |
| Test No. | Agents Added | % Lipophilic Clay (Hydrocarbon Wet) |
| F | Cla-Sta + sulfonate | 92 |
| G | Cla-Sta | 74 |
| H | Sulfonate | 82 |
| I | Polyacrylate | 18 |

In summary, the clay was highly lipophilic, and this characteristic was reduced only slightly by addition of sulfonate or a combination of the cationic polymer and sulfonate. Treatment with Cla-Sta alone reduced the lipophilic character some 26–31% but the use of polyacrylate in Tests D, E and I was very effective, reducing the lipohylic fraction to only about 20%.

I claim:

1. A method for reducing the adsorption of surfactants and organic polymers in formations treated with polyfunctional cationic polymers comprising treating said formation with water and low molecular weight polyfunctional anionic polymers in an amount sufficient to reduce the adsorption of said surfactant and said organic polymer.

2. A method according to claim 1 wherein said polyfunctional anionic polymers are at least one of poly(acrylic acid), poly(acrylic acid-co-acrylamide), poly(acrylic acid-co-styrene), poly(styrene sulfonic acid), poly(acrylic acid-co-styrene sulfonic acid), poly(vinylsulfonic acid), poly(methacrylic acid), poly(vinyl phosphoric acid), poly(chloroacrylic acid), poly(bromoacrylic acid), poly(vinylbenzoic acid), poly(vinylbutylsulfonic acid) or the salts of any of the above.

3. A method according to claim 1 where said polyfunctional anionic polymers are at least one of poly(sodium acrylate) and poly(sodium styrene sulfonate).

4. A method according to claim 1 where said polyfunctional anionic polymers are linear polymers.

5. A method according to claim 1 where said formation is at least partly clay material.

6. A method according to claim 1 where said polyfunctional anionic polymer has a degree of polymerization ranging from about 2 to about 100.

7. A method according to claim 1 where said polyfunctional anionic polymer is mixed with water in a concentration ranging from about 0.001 to about 10 weight percent in water before injecting said polymer into said formation.

8. A method according to claim 1 where said formation is a subterranean oil reservoir.

9. A method according to claim 1 where the amount of said polyfunctional anionic polymer present in relation to said polyfunctional cationic polymer in said formation ranges from about 0.5:1 to about 10:1, based on the reduced equivalents of each.

10. A method for recovering oil from polyfunctional cationic polymer stabilized subterranean oil formations using secondary recovery techniques comprising injecting into said formation, prior to or at the same time as the injection of surfactants or viscosity increasing agents, a mixture of water and at least one polyfunctional anionic polymer.

11. A method according to claim 10 where said polyfunctional anionic polymers are at least one of poly(acrylic acid), poly(acrylic acid-co-acrylamide), poly(acrylic acid-co-styrene), poly(styrene sulfonic acid), poly(acrylic acid-co-styrene sulfonic acid), poly(vinylsulfonic acid), poly(methacrylic acid), poly(vinyl phosphoric acid), poly(chloroacrylic acid), poly(bromoacrylic acid), poly(vinylbenzoic acid), poly(vinylbutylsulfonic acid) or the salts of any of the above.

12. A method according to claim 10 where said polyfunctional anionic polymers are at least one of poly(sodium acrylate) and poly(sodium styrene sulfonate).

13. A method according to claim 10 where said polyfunctional anionic polymers are linear polymers.

14. A method according to claim 10 where said polyfunctional anionic polymer has a degree of polymerization ranging from about 2 to about 100.

15. A method according to claim 10 where said polyfunctional anionic polymer is mixed with water in a concentration ranging from about 0.001 to about 10 weight percent in water before injecting said polymer into said formation.

16. A method according to claim 10 where the amount of said polyfunctional anionic polymer present in relation to said polyfunctional cationic polymer in said formation ranges from about 0.5:1 to about 10:1, based on the reduced equivalents of each.

* * * * *